(12) United States Patent
Smith

(10) Patent No.: US 12,195,125 B2
(45) Date of Patent: Jan. 14, 2025

(54) CLEVIS FOR A RACK AND PINION STEERING BOX

(71) Applicant: Shock Therapy Suspension, Inc., Duluth, GA (US)

(72) Inventor: Justin Smith, Wittmann, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

(21) Appl. No.: 18/457,019

(22) Filed: Aug. 28, 2023

(65) Prior Publication Data

US 2024/0253698 A1    Aug. 1, 2024

Related U.S. Application Data

(60) Provisional application No. 63/482,080, filed on Jan. 30, 2023.

(51) Int. Cl.
  *B62D 7/20*    (2006.01)
  *B62D 3/12*    (2006.01)

(52) U.S. Cl.
  CPC ............... *B62D 7/20* (2013.01); *B62D 3/12* (2013.01)

(58) Field of Classification Search
  CPC .................................... B62D 7/20; B62D 3/12
  See application file for complete search history.

(56) References Cited

U.S. PATENT DOCUMENTS

| | | | |
|---|---|---|---|
| 10,315,685 B2 * | 6/2019 | Assmann | F16D 3/387 |
| 2015/0040715 A1 * | 2/2015 | Assmann | B62D 1/20 74/498 |
| 2019/0375453 A1 * | 12/2019 | Buchwitz | B62D 7/166 |

FOREIGN PATENT DOCUMENTS

EP    2094986 B1 *    9/2010    ........... F16D 1/0894

OTHER PUBLICATIONS

EP-2094986-B1 Machine English translation (Year: 2010).*

* cited by examiner

*Primary Examiner* — Jason D Shanske
*Assistant Examiner* — Matthew James O'Neill
(74) *Attorney, Agent, or Firm* — Schmeiser, Olsen & Watts LLP

(57) ABSTRACT

A clevis for a rack and pinion steering box is provided. The clevis includes a base and two arms extending from the base to form a U-shape with each arm having an aperture with aligned axes. A clevis pin extends through the base in a direction opposite of the two arms. The clevis includes two clocking protrusions extending from the base in a direction opposite the two arms with the clevis pin is located between the two clocking protrusions. The rack includes two flat portions and the two clocking protrusion are configured to automatically orient the clevis at a predetermined angle with respect to the rack when the clevis pin is coupled to the rack. In operation, a clevis is coupled on opposing sides of the rack and clevis pivot points are maintained at a width length defined between the clevis pivot points, such as less than 350 mm.

5 Claims, 7 Drawing Sheets

CLEVIS FOR A RACK AND PINION STEERING BOX

CROSS REFERENCE TO RELATED APPLICATION(S)

This application claims priority to U.S. Provisional Patent Application entitled "CLEVIS FOR A RACK AND PINION STEERING BOX," Ser. No. 63/482,080, filed Jan. 30, 2023, the disclosure of which is hereby incorporated entirely herein by reference.

BACKGROUND OF THE INVENTION

Technical Field

This invention relates generally to rack and pinion steering and more particularly to a clevis for a rack and pinion steering box.

State of the Art

The ownership and utilization of UTVs has increased over the years. Conventionally, as shown in FIGS. 6 and 7, the steering is controlled using a rack and pinion steering block. The rack and pinion steering block couples the steering shaft to the pinion and the rack is coupled to tie rods that are coupled to the wheels in order to turn the wheels in response to turning the steering shaft by turning the steering wheel. Racks of the rack and pinion steering box are conventionally coupled to the tie rods using a ball and socket joints. The ball and socket joints operate to control the steering is a manner intended by the manufacturer. However, the factory ball and socket joints are generally weak and have a tendency to fail.

Accordingly, there is a need for a clevis to replace the factory ball and socket joints used with a rack and pinion steering box that still maintains the steering control provided by the factory ball and socket joints.

SUMMARY OF THE INVENTION

An embodiment comprises a tie rod connection device for a rack and pinion steering box comprising: a clevis comprising a base and two arms extending from the base to form a U-shape, each arm comprising an aperture with an axis, wherein the axis of each aperture is aligned; a clevis pin extending through the base in a direction opposite of the two arms, the clevis pin configured to couple to a rack of a rack and pinion steering box; and two clocking protrusions extending from the base in a direction opposite the two arms, wherein: the clevis pin is located between the two clocking protrusions; the rack comprises two flat portions corresponding to the space between the two clocking protrusions; and the two clocking protrusion are configured to automatically orient the clevis at a predetermined angle with respect to the rack in response to the two flat portions engaging the two clocking protrusions when the clevis pin is coupled to the rack.

Another embodiment includes a method of using a clevis for a rack and pinion steering box, the method comprising: coupling a clevis on opposing sides of a rack of a rack and pinion steering box; and maintaining clevis pivot points at a width length defined between the clevis pivot points of less than 350 mm.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
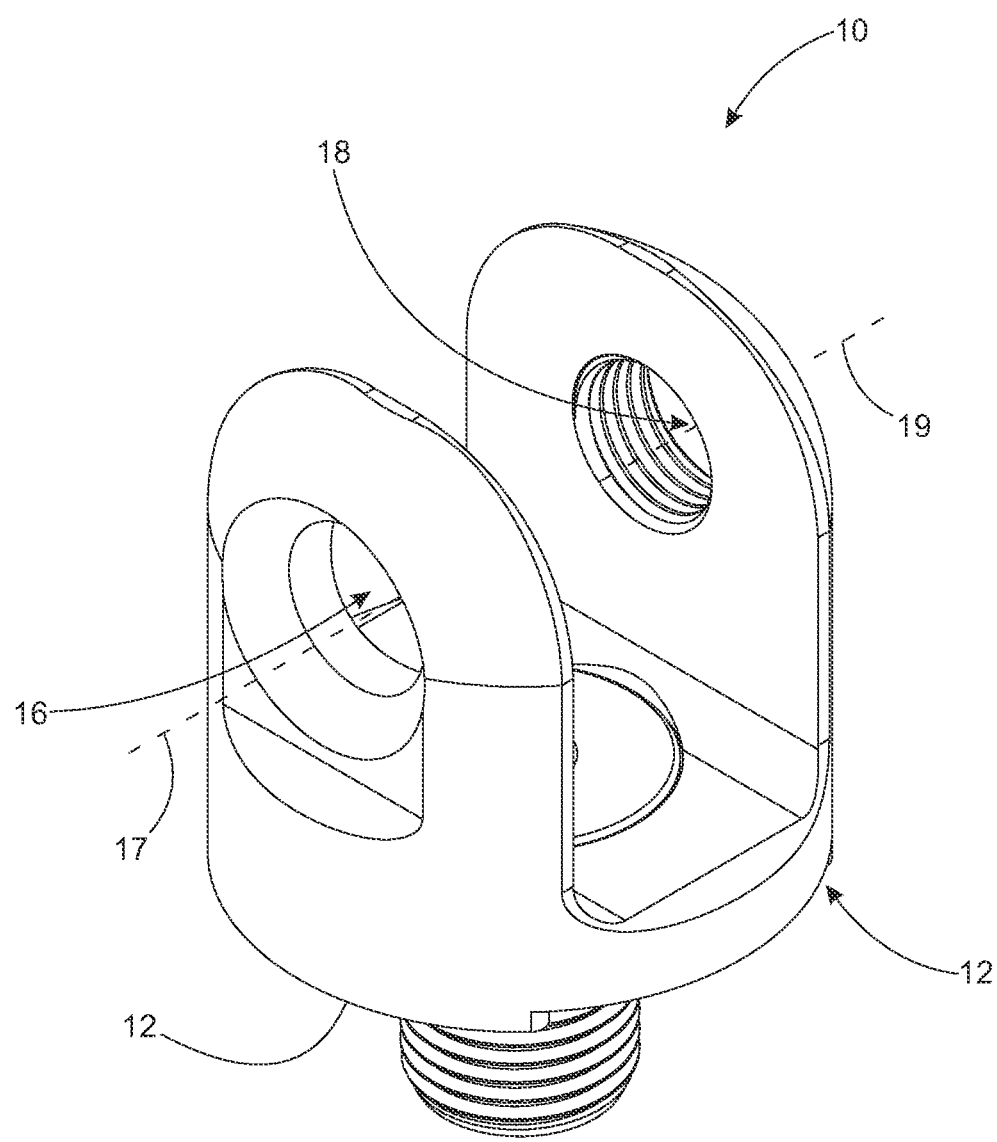
FIG. 1 is a perspective view of a clevis for a rack and pinion steering box according to an embodiment.
Figure 2:
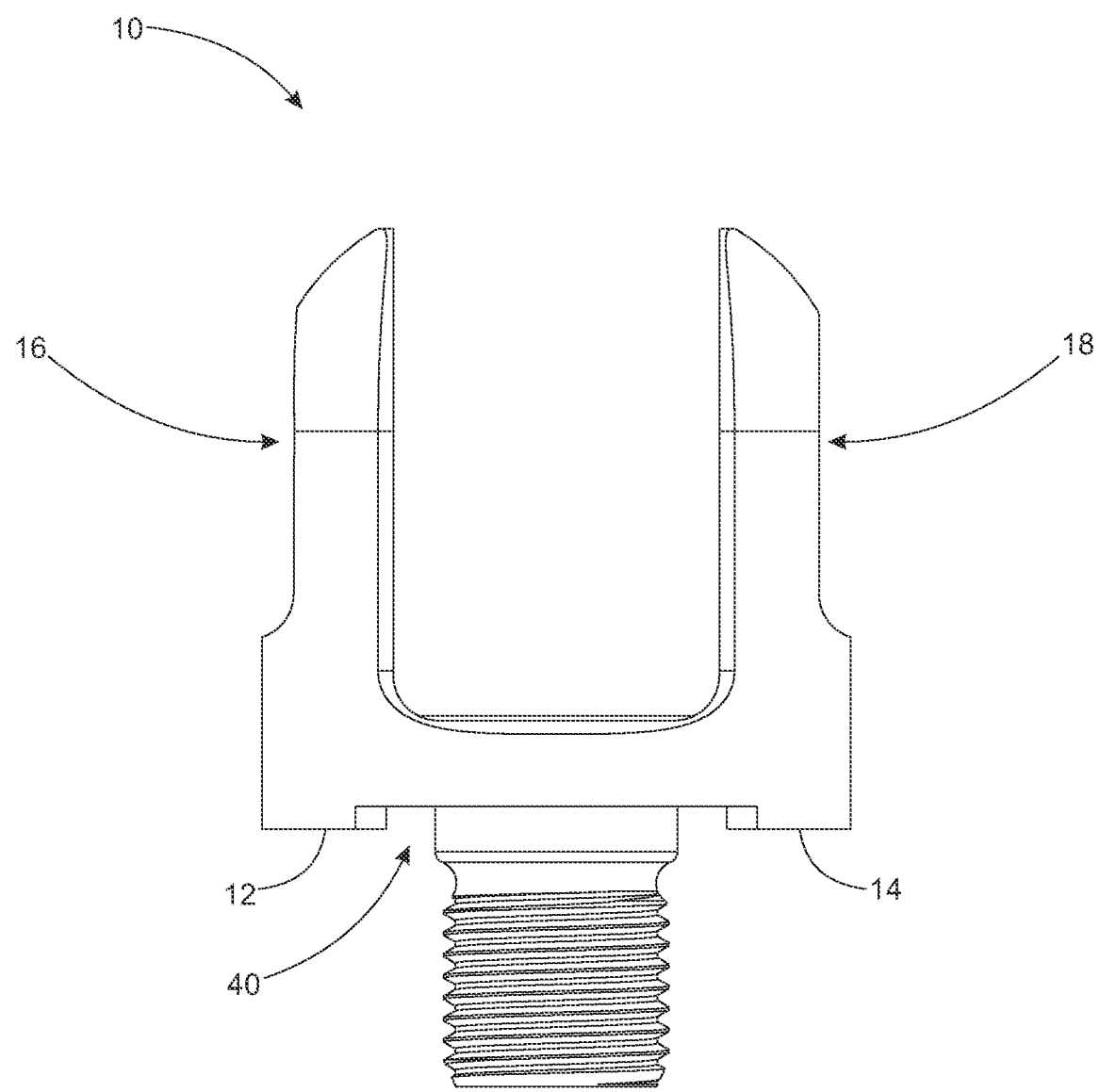
FIG. 2 is a front view of a clevis for a rack and pinion steering box according to an embodiment.
Figure 3:
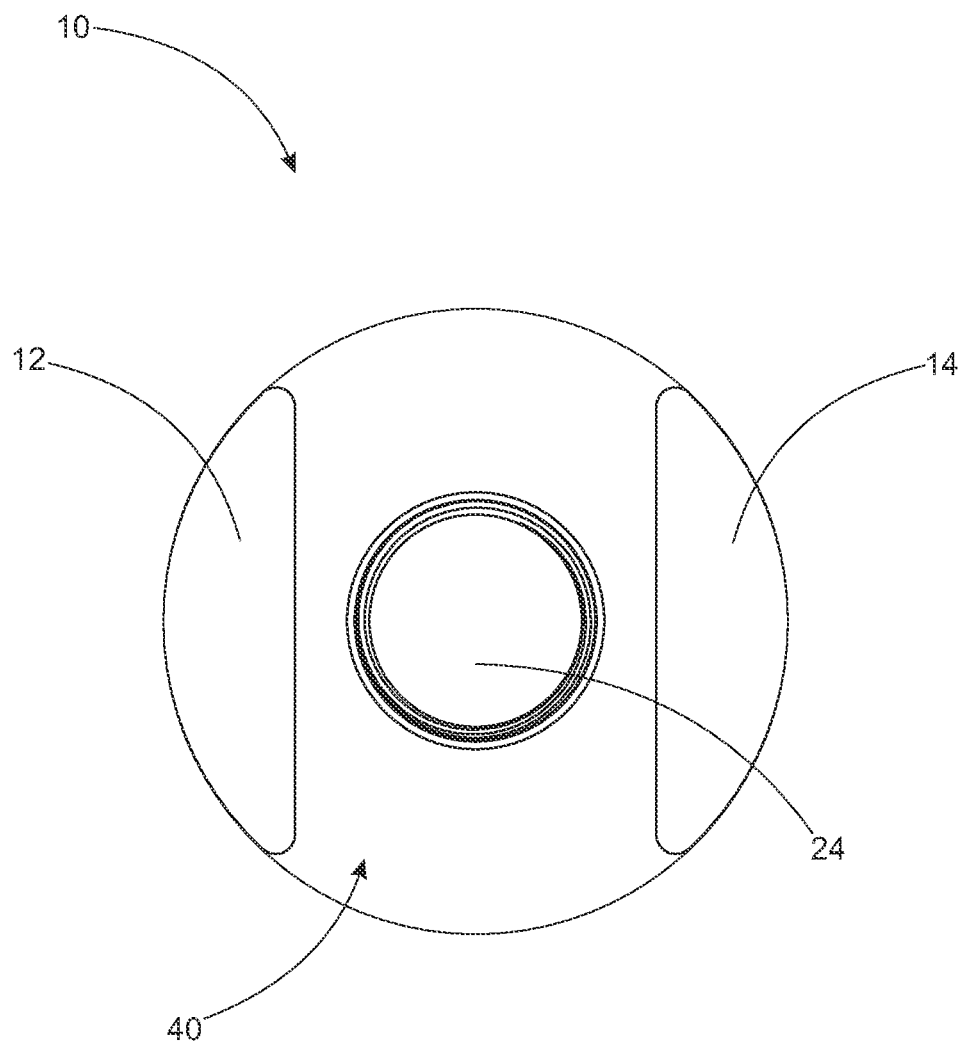
FIG. 3 is an end view of a clevis for a rack and pinion steering box according to an embodiment.
Figure 4:
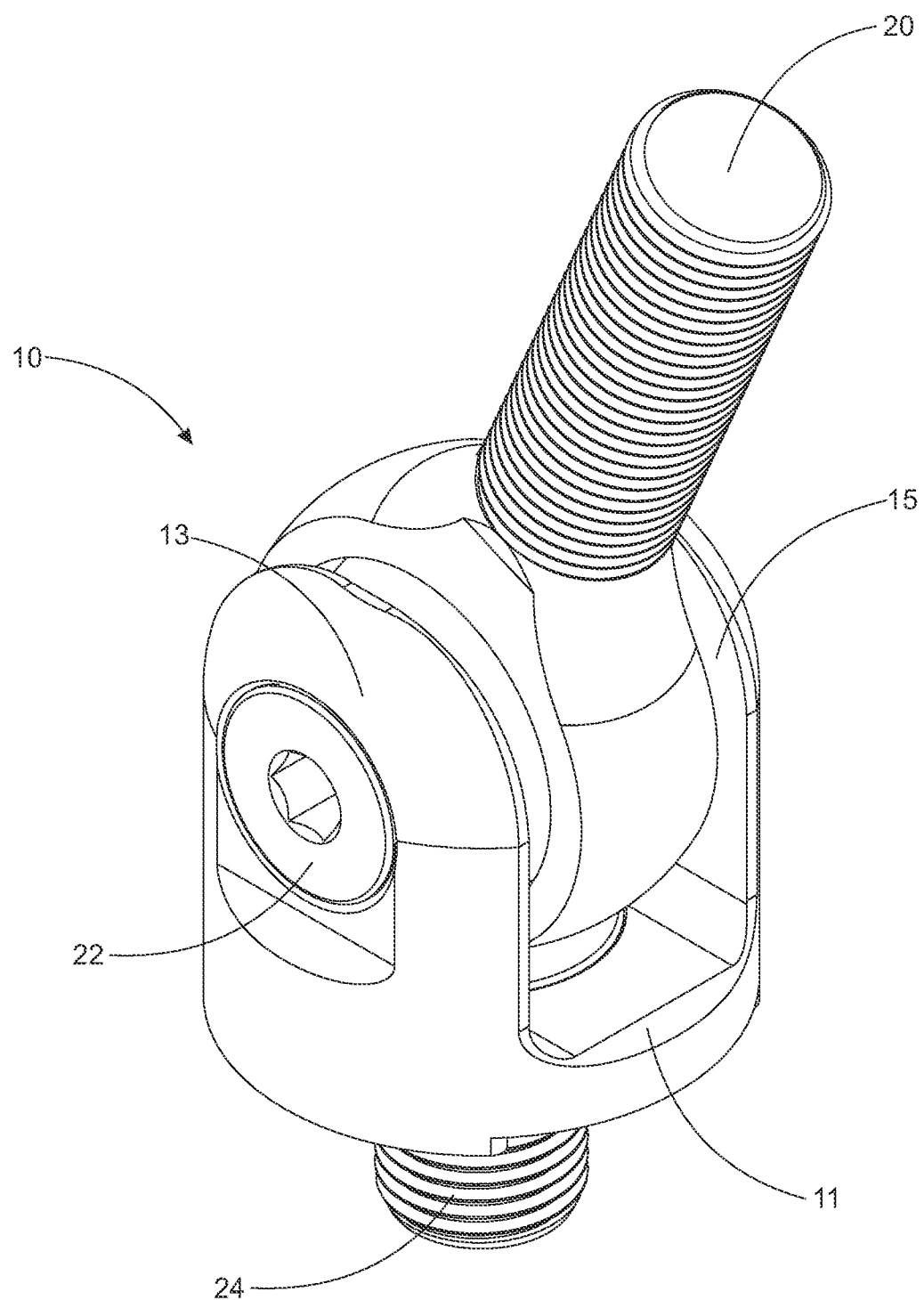
FIG. 4 is a perspective view of a clevis for a rack and pinion steering box coupled to a rod end of a tie rod according to an embodiment.

As discussed above, embodiments of the present invention relate to a clevis operating as a tie rod connection device to replace the factory ball and socket joints 50 used with a rack and pinion steering box (see FIGS. 6-7) that still maintains the steering control provided by the factory ball and socket joints 50. The steering clevis had at least two benefits. One, it replaces the factory ball and socket style joint that is weak and has a tendency to fail. Two, it provides the ability to couple to a rod end for the tie rod, which is much stronger than the ball and socket.

Referring to the drawings, FIGS. 1-5 depict an embodiment of a clevis 10 for use with a rack and pinion steering box. The clevis 10 comprises a base 11 and two arms 13 and 15 extending from the base to form a U-shape. Each arm 13 and 15 comprises an aperture 16 and 18 respectively. Each aperture 16 and 18 includes an axis 17 and 19 respectively, wherein the axis 17 and 19 of the apertures 16 and 18 are aligned. The clevis includes a clevis pin 24 extending through the base 11 in a direction opposite of the two arms 13 and 15. The clevis pin 24 is configured to couple to a rack 30 (see FIG. 5) of a rack and pinion steering box.

The clevis 10 further comprises two clocking protrusions 12 and 14 extending from the base 11 in a direction opposite the two arms 13 and 15. The two clocking protrusions 12 and 14 comprise a space 40 extending between the two clocking protrusions 12 and 14. The clevis pin 24 is located in the space 40 between the two clocking protrusions 12 and 14.

Figure 5:
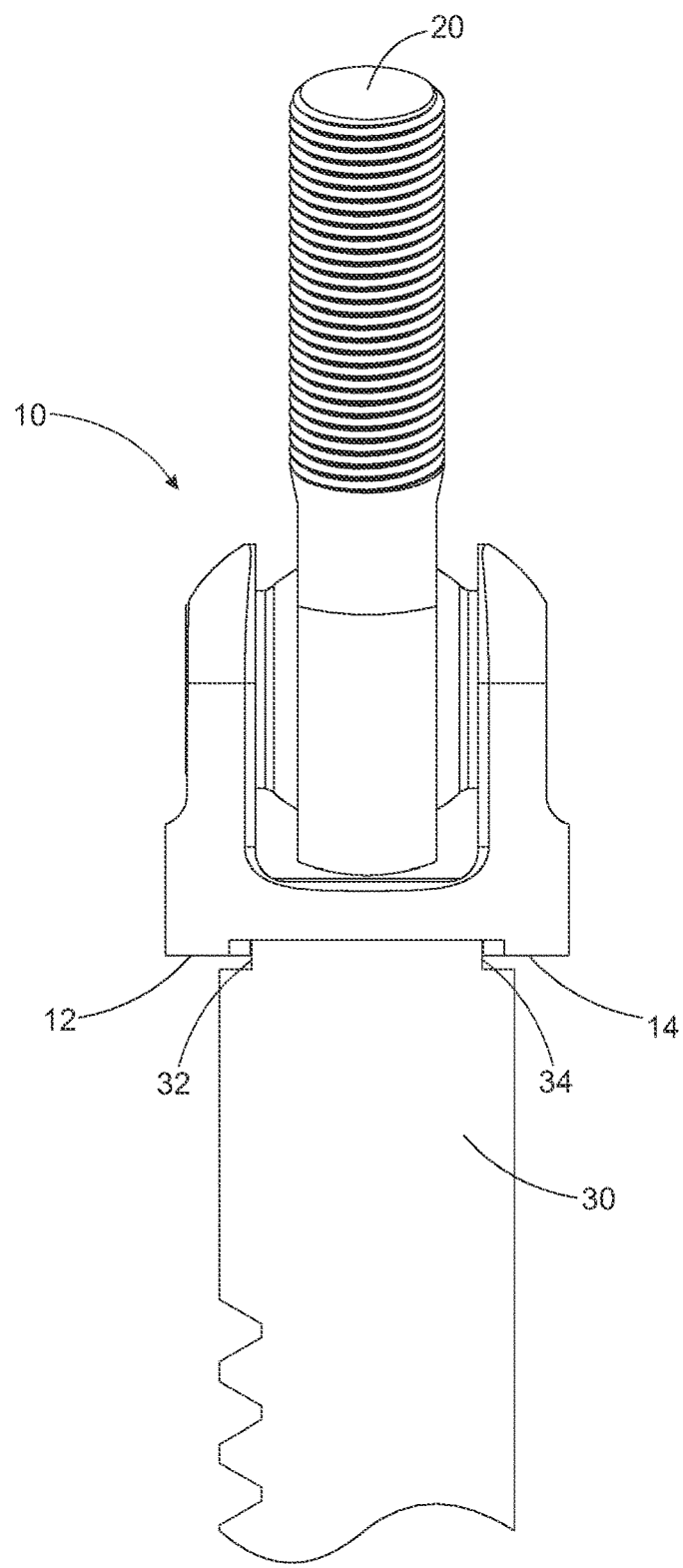
FIG. 5 is a front view of a clevis for a rack and pinion steering box coupled to a rod end of a tie rod according to an embodiment.

As shown in FIG. 5, the rack 30 comprises two flat portions 32 and 34 corresponding to the space 40 between the two clocking protrusions 12 and 14. The two clocking protrusions 12 and 14 are configured to automatically orient the clevis 10 at a predetermined angle with respect to the rack 30 in response to the two flat portions 32 and 34 of the rack 30 engaging the two clocking protrusions 12 and 14 of the clevis 10 when the clevis pin 24 is coupled to the rack 30. The clevis 10 may then be coupled to a tie rod end 20 with bolt 22 coupling through the apertures 16 and 18 of the arms 13 and 15 respectively of the clevis 10.

Figure 6:
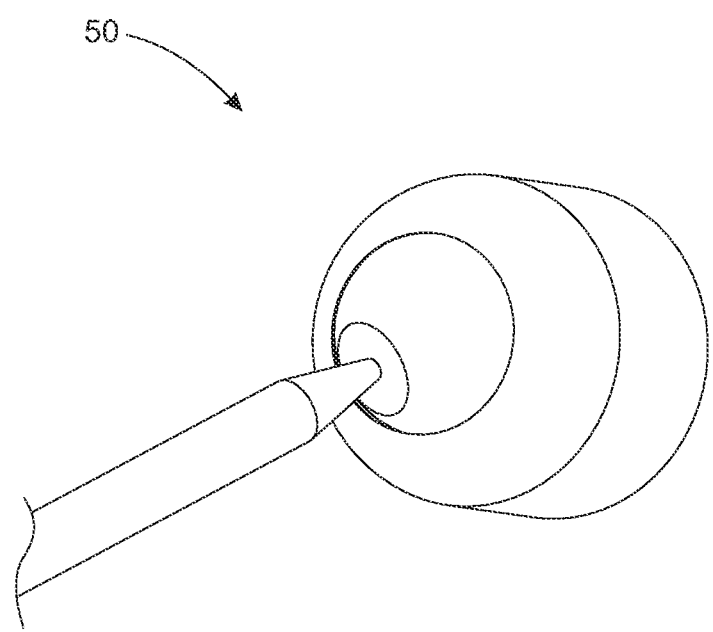
FIG. 6 is a perspective view of a prior art rack and pinion steering box.
Figure 7:
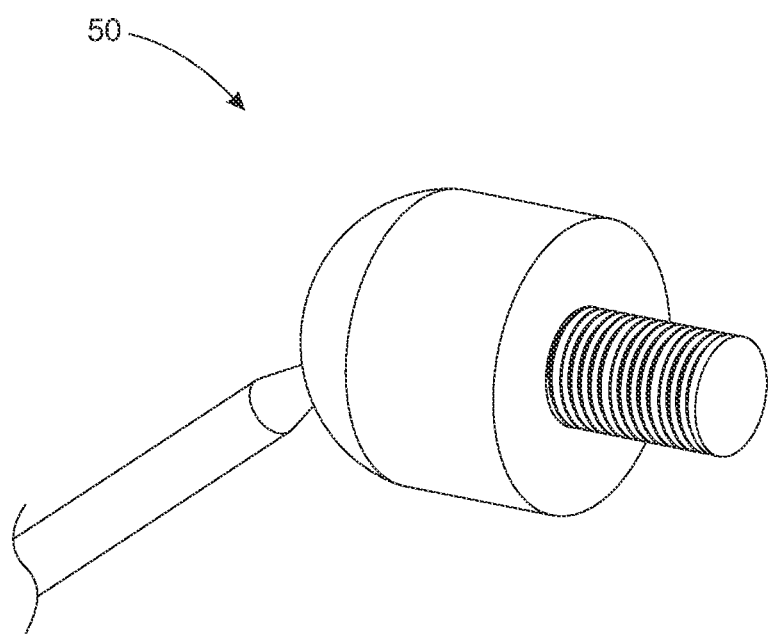
FIG. 7 is another perspective view of a prior art rack and pinion steering box.

Another extremely important factor in the design of the clevis 10 is the affect it has on the factory geometry of the front suspension and steering. The location of the factory pivot point in the factory ball and socket 50, as shown in FIG. 6-7, on the rack 30 affects much. If the location of the factory pivot point is changed, either up or down, or wider or narrower, the geometry is negatively affected. The toe setting of the front tires will change as the suspension cycles up or down in rough terrain when driving. This change in toe setting is commonly referred to as "bump steer". The more you change the factory location of this pivot point the worse the bump steer is. Normal front-end geometry tries to maintain a toe setting that changes less than ¼" through total suspension travel. More than this change (½ to 4") will cause horrible feedback in the steering wheel that can tear the wheel out of your hands, cause premature wear to steer and suspension components, ruin power steering units and make the car unstable in rough terrain especially at speed. Minor changes in this pivot point can cause large changes in bump steer. For example, a 0.250 inch change in width will cause up to 2" of toe change, or bump steer through cycle. It is paramount to keep this location stock or as close to it as possible. Embodiments of the clevis 10 again utilize the two clocking protrusions 12 and 14 to automatically orient the clevis 10 at a predetermined angle with respect to the rack 30 to maintain the factory geometry of the front suspension and steering. Again, this is done in response to the two flat portions 32 and 34 of the rack 30 engaging the two clocking protrusions 12 and 14 of the clevis 10 when the clevis pin 24 is coupled to the rack 30 to automatically orient the clevis 10 in the proper angle. The clevis 10 may then be coupled to a tie rod end 20 with bolt 22 coupling through the apertures 16 and 18 of the arms 13 and 15 respectively of the clevis 10 to keep the factory geometry of the front suspension and steering.

Accordingly, an embodiment comprises a method of using a clevis, wherein the method includes coupling a clevis 10 on opposing sides of a rack 30 of a rack and pinion steering box; and maintaining clevis pivot points (axis locations of the apertures 16 and 18 of the arms 13 and 15 of the clevises 10) at a width length defined between the clevis pivot points. Certain off-road vehicles have a predetermined width length between the clevis pivot points. For example, the width length for a Polaris Pro R or Polaris Turbo R of less than 350 mm. Accordingly, in embodiments, the width length between the clevis pivot points may be less than 350 mm. In other words, the width length between the clevis pivot points will not be longer than 349 mm. The method may also comprise automatically orienting the clevis pivot points (axis locations of the apertures 16 and 18 of the arms 13 and 15 of the clevises 10) at a predetermined angle with respect to the rack 30 in response to the clocking protrusions 12 and 14 engaging two flat portions 32 and 34 of the rack respectively.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A tie rod connection device for a rack and pinion steering box comprising:
   a clevis comprising a base and two arms extending axially from the base on one side thereof to form a U-shape;
   a clevis pin extending axially through the base from the one side thereof and in a direction opposite of the two arms, the clevis pin configured to couple to a rack of a rack and pinion steering box; and
   two clocking protrusions extending axially from the other side of the base in a direction opposite the two arms, wherein the two clocking protrusions are respectively aligned with the two arms, wherein:
   the clevis pin is located between the two clocking protrusions, wherein the clevis pin extends in a parallel relationship with the two clocking protrusions;
   the rack comprises two flat portions corresponding to the space between the two clocking protrusions; and
   the two clocking protrusions are configured to automatically orient the clevis at a predetermined angle with respect to the rack in response to the two clocking protrusions engaging the two flat portions of an end of the rack when the clevis pin is coupled to the rack.

2. The device of claim 1, wherein each arm of the clevis comprises an aperture with an axis, wherein the axis of each aperture is aligned.

3. A method of using a clevis for a rack and pinion steering box, the method comprising:
   coupling a clevis having a base and two arms extending axially from the base on one side thereof to form a U-shape on opposing sides of a rack of a rack and pinion steering box; axially extending a clevis pin through the base from the one side thereof and in a direction opposite of the two arms; configuring the clevis pin to couple the clevis to the rack of the rack and pinion steering box; axially extending two clocking protrusions from the other side of the base of the clevis in a direction opposite the two arms, wherein the two clocking protrusions are respectively aligned with the two arms; locating the clevis pin between the two clocking protrusions, wherein the clevis pin extends in a parallel relationship with the two clocking protrusions; and maintaining clevis pivot points at a width length defined between the clevis pivot points.

4. The method of claim 3, wherein the width length is less than 350 mm.

5. The method of claim 3, further comprising automatically orienting the clevis pivot points at a predetermined angle with respect to the rack in response to the two clocking protrusions of the clevis engaging two flat portions of the rack.

* * * * *